United States Patent [19]

Uhrig et al.

[11] 4,297,270
[45] Oct. 27, 1981

[54] MANUFACTURE AND USE OF NON-IONOGENIC INTERFACE-ACTIVE AGENTS BASED ON MODIFIED ROSINS

[75] Inventors: Heinz Uhrig, Steinbach; Reinhold Deubel, Bad Soden am Taunus, both of Fed. Rep. of Germany

[73] Assignee: Hoechst Aktiengesellschaft, Frankfurt am Main, Fed. Rep. of Germany

[21] Appl. No.: 75,034

[22] Filed: Sep. 13, 1979

[30] Foreign Application Priority Data

Sep. 15, 1978 [DE] Fed. Rep. of Germany ....... 2840113
Jun. 16, 1979 [DE] Fed. Rep. of Germany ....... 2924354

[51] Int. Cl.³ .................. C09F 1/04; D06M 15/02
[52] U.S. Cl. ................................ 260/104; 252/8.6; 252/8.7; 252/8.9; 252/356; 260/97
[58] Field of Search ............... 252/356, 8.6, 8.7, 8.9; 260/97, 104

[56] References Cited

U.S. PATENT DOCUMENTS

| | | | |
|---|---|---|---|
| 1,984,713 | 12/1934 | Weiland et al. | 252/354 |
| 2,437,481 | 3/1948 | Rummelsburg | 260/97 |
| 3,235,526 | 2/1966 | Williams | 252/356 |
| 3,594,123 | 7/1971 | Encke et al. | 23/165 |
| 3,761,461 | 9/1973 | Pleso et al. | 260/112.5 |

FOREIGN PATENT DOCUMENTS 1769331 3/1972 Fed. Rep. of Germany .
946189 5/1949 France .
1008635 5/1952 France .

Primary Examiner—H. S. Cockeram
Attorney, Agent, or Firm—Curtis, Morris & Safford

[57] ABSTRACT

Compounds of the formula $$A[(X\!-\!O)_n\!-\!H]_m$$

wherein
 A is a cycloalkyl-, aralkyl- or aryl-modified rosin acid radical or a radical of an ester of a polyhydric alcohol with such an acid,
 X stands for the same or different group or groups of the formulae $$-CH_2-CH_2-$$

and $$-CH_2-CH(CH_3)-,$$

n is a number of 1 to 100 and
m is an integer of 1 to 5
are surface- and interface-active agents, especially dispersants, emulsifiers, wetting agents and dyeing adjuvants.

8 Claims, No Drawings

MANUFACTURE AND USE OF NON-IONOGENIC INTERFACE-ACTIVE AGENTS BASED ON MODIFIED ROSINS

The present invention relates to non-ionogenic compounds based on modified natural rosins, their manufacture and their use as interface-active agents.

One embodiment of the invention is compounds of the general formula $$A-[(X-O)_n-H]_m$$

in which

A stands for a cycloalkyl-, aralkyl- or aryl-modified rosin acid radical or the esterification product thereof with a polyol, X strands for identical or different groups of the formula $$-CH_2-CH_2-$$

or $$-CH_2-CH(CH_3)-,$$

n is a number of from 1 to 100, and
m is an integer of from 1 to 5.

Another embodiment of the invention is a process for the preparation of these compounds, which comprises reacting compounds of the general formula $$A-(H)_m$$

with n·m mols of ethylene oxide and/or propylene oxide, A, n and m being defined as above.

A further embodiment of the invention is the use of these compounds as interface-active agents, especially as dispersing agents for the fine distribution and stabilization of solids, and as wetting, emulsifying, levelling and dyeing auxiliaries.

The rosin acid radical A is preferably derived from the following compounds:

(a) modified rosin acids and/or mixtures of the same, as they are obtained from commercial types of colophony or disproportionation products thereof by a reaction with aromatic hydroxy compounds or with cycloalkyl, preferably aryl or aralkyl compounds capable of splitting of halogen, (b) esterification products and/or mixtures thereof, as obtained by esterification from 1 mol of a di- to hexahydric alcohol with of 1 to 4, preferably from 1 to 2, mols of a rosin acid modified according to (a) and/or mixtures thereof.

The starting materials are obtained by reacting natural rosin acids or the disproportionation products thereof with aromatic hydroxy compounds or with cycloalkyl, preferably aralkyl or aryl compounds capable of splitting off halogen, according to known processes and optionally esterifying the products with polyols.

In the following, the percentages refer to the weight unless otherwise stated.

Suitable modified rosins are rosin-phenol compounds, as obtained by the addition of phenol, o-, m- or p-cresol, o-cresol acetate, salicylic acid, guaiacol, bisphenol A or α- or β-naphthol to natural rosin acids, such as abietic acid, dehydroabietic acid, dihydroabietic acid, tetrahydroabietic acid, levopimaric acid, dextropimaric acid and isodextropimaric acid, as present in commercial types of colophony, as well as to disproportionated, hydrogenated and dimerized rosin acids in the presence of strongly acid catalysts or catalysts splitting off acid, for example, boron trifluoride, hydrogen chloride, tin tetrachloride, aluminum chloride or strong mineral acids at a temperature of from 20° to 120° C. in an organic medium, wherein there is reacted per mol of rosin acid suitably from 0.5 to 1.0, preferably from 0.7 to 0.8, mol of the above-mentioned phenols or naphthols.

Also suitable are modified natural rosin acids, as obtained by a reaction of natural rosin acids with aryl, aralkyl or cycloalkyl compounds capable of splitting off halogen, from example, benzyl chloride, bis-(chloromethyl) benzene, chloromethyl toluene, 4-chloromethyl-diphenyl ether, 1-(chloromethyl) naphthalene, benzal chloride, 2-, 3- or 4-chlorophenol, 5-chloro-2-hydroxy-toluene, 2-chloro-5-hydroxy-1,3-xylene, 4-chlorobenzyl, alcohol, 4-chlorodiphenyl, 4-chloro-diphenyl ether, 1-chloronaphthalene, 2-chloronaphthalene, 4-chloro-1-naphthol, 1-chloro-2-naphthol, 2-chloro-1-naphthol and cyclohexyl chloride in the presence of a catalyst, such as about 0.2% zinc chloride, at a temperature of from 100° to 220° C., preferably from 150° to 210° C., in such process there is reacted, per mol of rosin acid, suitably from 0.5 to 1.0, preferably from 0.7 to 0.8, mol of the above-mentioned compounds capable of splitting off halogen.

Thus, preferred modified rosins contain—optionally bound via a methylene group—phenyl or naphthyl radicals which may be substituted by hydroxy, lower alkyl, lower alkoxy, carboxy, phenyl or hydroxyalkyl groups, the hydroxy and carboxy groups thus introduced are also suitably alkoxylated.

The following are examples of polyols suitable for the esterification of the modified rosin acids: glycol, glycerol, 1,2,4-butane triol, butane diol-(1,4), 1,1,1-trimethylol propane, pentaerythritol, 2,4-dihydroxy-3-methylol pentane, hexane triol, sorbitol, anhydrosorbitol, hexitol and mannitol. The esterification of the modified rosin acids with the polyols is effected in a molar ratio of from 1:1 to 4:1, preferably from 1:1 to 2:1, in accordance with known esterification processes at a temperature of from 180° to 300° C., preferably from 200° to 270° C., optionally while adding an entrainer, such as an aromatic hydrocarbon or chlorinated hydrocarbon. As catalysts there may be used, for example, benzene-sulfonic acid, p-toluene-sulfonic acid, boric acid, powdered tin or sulfuric acid.

The reaction of the modified natural rosin acids and the esterification products thereof with 1,2-propylene oxide and/or, preferably, ethylene oxide is carried out according to known methods, preferably with alkali metal hydroxides or alkoxides as catalysts at 100° to 200° C., preferably at 140° to 180° C.

Suitable alkali metal hydroxides are potassium hydroxide and, preferably, sodium hydroxide; suitable alkali metal alkoxides are sodium methylate and sodium ethylate. The catalyst concentration is in the range of from 0.05 to 1.0%, calculated on the starting material. The oxalkylation may be carried out without pressure or in pressure vessels with propylene oxide or preferably ethylene oxide or mixtures of the same, the ethylene oxide being fed in in either a gaseous or liquid state. If pressure is applied for the operation, it is in the range of from 1 to 10, preferably from 2 to 8, bars of over-pressure.

The amount of ethylene oxide and/or propylene oxide is proportioned in a way that a stable emulsifiability or a complete solubility of the addition products in water is reached. There are advantageously added from 1 to 100, preferably from 8 to 75, mols each of ethylene oxide and/or propylene oxide to each free carboxy and hydroxy group of the modified natural rosin acids or esterification products of these modified natural rosin acids. The amount of alkylene oxide added is also proportioned in accordance with the desired application, and thus with the degree of hydrophilic properties intended to be exhibited.

The starting materials obtained by the addition of phenols to natural rosin acids are known and suitable for preparation of lacquers (German Pat. Nos. 536,170; 581,956; 582,846 and 652,602), whereas the starting materials obtained by the reaction of natural rosin acids with aryl or aralkyl compounds capable of splitting off halogen and subsequent esterification with alcohols are described as oil-soluble synthetic resins (German Pat. No. 570,958).

It has further been known to oxethylate colophony, in which process there are obtained detergents, emulsifying and levelling agents (Ullmanns Encyklopädie der technischen Chemie, 3rd edition, vol. 8, page 409).

The oxalkylation products of the invention and/or their mixtures yield, in water, stable emulsions or are clearly soluble in water, they reduce the surface tension according to the ring method for measuring the surface tension (DIN 53 914) to 0.04 N/m and are almost free from foam according to the Ross-Miles test (DIN 53 902). They wet cotton fabric according to the dip-wetting method (DIN 53 901) within 70 to 180 seconds and are resistant to strong alkali and to strong acids under the common application conditions for surfactants. In an aqueous solution, the products show a very light color or are practically colorless.

The compounds of the invention are excellently suitable as dispersing, wetting and distributing agents, for example for pigments, furthermore for the formulation of plant protective and pest control agents and as emulsifiers for the preparation of carrier emulsions and as levelling and dyeing auxiliaries in the dyeing and printing of natural and synthetic fiber material, such as cotton, wool, cellulose, spun rayon, cellulose acetate and triacetate, polyester, polyamides and polyacrylonitrile, or of fiber materials containing said substances.

The advantages of the compounds of the invention as compared with known non-ionogenic compounds are to be seen in the fact that they hardly show any foaming tendency, but exhibit a markedly improved dispersion behavior in aqueous applications and, likewise, favorable wetting properties. The novel products are also easily biodegradable.

The compounds of the invention may be employed by themselves, as a mixture or in combination with other non-ionogenic as well as anionic or cationic compounds, builders and other additives and auxiliaries in emulsifying and dispersing agent formulations.

In the following Examples the preparation of the compounds of the invention is described. Parts and percentages relate to the weight, and pressure values to overpressure unless otherwise stated. The acid numbers (AN) are determined according to DIN 53 185.

EXAMPLE 1

(a) Preparation of the rosin-phenol compound 173.8 Parts of a 25% solution of boron trifluoride in phenol are added while stirring at 10° C. within 4 hours to a solution of 604 parts of colophony in 800 parts of tetrachloromethane, and stirring is continued for 14 hours at 15° to 18° C. For the elimination of the catalyst, the reaction mixture is washed with water until neutral and dried over anhydrous sodium sulfate. Subsequently the tetrachloromethane is removed by distillation. There are obtained 630 parts of a clear resin having an AN of about 114 and a softening point of about 105° C.

(b) Preparation of the rosin oxalkylate

After having added 1.5 parts of sodium hydroxide, 367 parts of the modified rosin described under (a) are oxethylated in a pressure vessel, with stirring and feeding in of 378.4 parts of ethylene oxide at 150° to 170° C., while maintaining a pressure of from 1.5 to 2.5 bars. After the total amount of ethylene oxide has been introduced under pressure, stirring is continued for 1 hour at 150° to 160° C. There is obtained a viscous brown rosin oxethylate having an ethylene oxide content of 8.6 mols, the cloud point of the product being found at 56.5° C. in a 25% butyl-diglycol solution.

EXAMPLE 2

After the addition of 1.5 parts of sodium hydroxide, 367 parts of the rosin prepared according to Example 1 (a) are oxethylated in a pressure vessel, with stirring and feeding in of 2200 parts of ethylene oxide at 150° to 170° C., while maintaining a pressure of from 1.5 to 2.5 bars. After the total amount of ethylene oxide has been introduced under pressure, stirring is continued for 1 hour at 150° to 160° C. The wax-like rosin oxethylate obtained is ocher-colored and contains 50 mols of ethylene oxide. Its cloud point in aqueous solution is found at about 60° C.

EXAMPLE 3

After having added 1.5 parts of sodium hydroxide, 367 parts of the rosin prepared according to Example 1(a) are oxethylated in a pressure vessel, with stirring and feeding in of 3300 parts of ethylene oxide at 150° to 170° C., while maintaining a pressure of from 1.5 to 2.5 bars. After the total amount of ethylene oxide has been introduced under pressure, stirring is continued for 1 hour at 150° to 160° C. The resulting rosin oxethylate contains 75 mols of ethylene oxide and corresponds in its appearance to the addition product of Example 2. The cloud point in a 25% butyl-diglycol solution is found at 101° to 102° C.

EXAMPLE 4

(a) Preparation of the rosin-guaiacol compound 264.5 Parts of a 25% solution of boron trifluoride in guaiacol are introduced while stirring at 10° C. within 4 hours to a solution of 604 parts of colophony in 800 parts of tetrachloromethane, and stirring is continued for 14 hours at 15° to 18° C. After the working-up according to Example 1 there are obtained 630 parts of a clear rosin having an AN of about 101 and a softening point of about 110° C.

(b) Preparation of the rosin oxethylate

After having added 1.5 parts of sodium hydroxide, 367 parts of the modified rosin described under (a) are oxethylated in a pressure vessel, with stirring and feeding in of 2200 parts of ethylene oxide at 150° to 170° C., while maintaining a pressure of from 1.5 to 2.5 bars. After the total amount of ethylene oxide has been introduced under pressure, stirring is continued for 1 hour at 150° to 160° C. The brown rosin oxethylate obtained is of a wax-like consistency and contains 50 mols of ethylene oxide. The cloud point in aqueous solution is found at 97° C.

EXAMPLE 5

After having added 1.5 parts of sodium hydroxide, 868.5 parts of the modified rosin prepared according to Example 4(a) are oxethylated in a pressure vessel, with stirring and feeding in of 3300 parts of ethylene oxide at 150° to 170° C., while maintaining a pressure of from 1.5 to 2.5 bars. After the total amount of ethylene oxide has been introduced under pressure, stirring is continued for 1 hour at 150° to 160° C. The wax-like rosin oxethylate obtained is ocher-colored and contains 75 mols of ethylene oxide. The cloud point in aqueous solution is found at 96.5° C.

EXAMPLE 6

(a) Preparation of the rosin-salicylic acid compound

174 Parts of boron trifluoride-ethyl ether complex are added with stirring at 10° C. within 4 hours to a solution of 604 parts of colophony and 220.8 parts of salicylic acid in 600 parts ot tetrachloromethane, and stirring is continued for 14 hours at 15° to 18° C. After working-up according to Example 1 there are obtained 710 parts of a clear rosin having an AN of about 173 and a softening point of from about 115° to 120° C.

(b) Preparation of the rosin oxethylate

After having added 1.5 parts of sodium hydroxide, 412.4 parts of the modified rosin described under (a) are oxethylated in a pressure vessel, with stirring and feeding in of 1100 parts of ethylene oxide at 150° to 170° C., while maintaining a pressure of from 1.5 to 2.5 bars. After the total amount of ethylene oxide has been introduced under pressure, stirring is continued for 1 hour at 150° to 160° C. The wax-like brown rosin oxethylate obtained contains 25 mols of ethylene oxide and shows a cloud point in a 10% sodium chloride solution of 49.5° C.

EXAMPLE 7

(a) Preparation of the rosin-naphthol compound

At 10° C., 106 parts of boron trifluoride-ethyl ether complex are added while stirring within 4 hours to a solution of 604 parts of colophony and 203.2 parts of β-naphthol in 600 parts of tetrachloromethane, and stirring is continued for 14 hours at 15° to 18° C. After working-up according to Example 1 there are obtained 726.3 parts of a clear rosin having an AN of about 145 and a softening point of from about 115° to 120° C.

(b) Preparation of the rosin oxethylate

After having added 3.0 parts of sodium methylate, 403.6 parts of the modified rosin specified under (a) are oxethylated in a pressure vessel, with stirring and feeding in of 2200 parts of ethylene oxide at 160° to 180° C., while maintaining a pressure of from 2 to 8 bars. Stirring is continued for 1 hour at 150° to 160° C. The wax-like yellowish brown rosin oxethylate obtained contains 50 mols of ethylene oxide with a cloud point in a 25% butyl diglycol solution of 95.5° C.

EXAMPLE 8

(a) Preparation of the rosin-phenol compound

At 10° C., 173.8 parts of a 25% solution of boron trifluoride in phenol are added while stirring within 4 hours to a solution of 604 parts of colophony in 800 parts of tetrachloromethane, and stirring is continued for 14 hours at 15° to 18° C. After working-up according to Example 1, there are obtained about 630 parts of a clear rosin having an AN of 114 and a softening point of about 105° C.

(b) Preparation of the rosin-phenol-glycerol ester

367 Parts of the rosin-phenol compound described under (a) are esterified in the presence of 5 parts of powdered tin with 92 parts of glycerol in a stirring vessel, while eliminating the reaction water by distillation, within 8 to 10 hours at a temperature of from 230° to 250° C., while simultaneously passing nitrogen through the vessel, until an AN of about 25 has been reached.

(c) Preparation of the rosin-phenol-glycerol ester oxethylate

After having added 3.3 parts of sodium methylate, 438 parts of the rosin-phenol-glycerol ester described under (b) are oxethylated in a pressure vessel, with stirring and feeding in of 440 parts of ethylene oxide at 150° to 160° C., while maintaining a pressure of from 2 to 3 bars. After the total amount of ethylene oxide has been introduced under pressure, stirring is continued for 1 hour at 150° to 160° C. There is obtained a viscous brown rosin glycerol ester oxethylate containing 10 mols of ethylene oxide and showing a cloud point in a 25% butyl diglycol solution of 56.5° C.

EXAMPLE 9

(a) Preparation of the rosin-cresol compound

At 10° C., 200 parts of a 25% solution of boron trifluoride in technical cresol are added while stirring within 4 hours to a solution of 604 parts of colophony in 800 parts of tetrachloromethane, and stirring is continued for 14 hours at 15° to 18° C. After working-up according to Example 1, there are obtained 767 parts of a clear rosin having an AN of 117 and a softening point of from 105° to 110° C.

(b) Preparation of the rosin-cresol-glycerol ester

377 Parts of the rosin-cresol compound described under (a) are esterified in the presence of 5 parts of powdered tin with 92 parts of glycerol in a stirring vessel, while eliminating the reaction water by distillation, within 8 to 10 hours at 230° to 250° C., while simultaneously passing nitrogen through the vessel, until an AN of about 25 has been reached.

(c) Preparation of the rosin-cresol-glycerol ester oxethylate

451 Parts of the rosin-cresol-glycerol ester described under (b) are oxethylated with 440 parts of ethylene oxide, after 3.3 parts of sodium methylate have been added. The brown rosin ester addition product obtained is viscous and contains 10 mols of ethylene oxide. The cloud point in a 25% butyl diglycol solution is found at 60° C.

EXAMPLE 10

(a) Preparation of the rosin-phenol compound

At 10° C., 173.8 parts of a 25% solution of boron trifluoride in phenol are added within 4 hours to a solution of 604 parts of disproportionated colophony in 800 parts of tetrachloromethane, and stirring is continued for 14 hours at 15° to 18° C. After working-up according to Example 1, there are obtained 625 parts of a clear rosin having an AN of 111 and a softening point of from about 90° to 100° C.

(b) Preparation of the rosin-phenol-glycerol ester

367 Parts of the rosin-phenol compound described under (a) are esterified in the presence of 5 parts of powdered tin with 92 parts of glycerol in a stirring vessel, while eliminating the reaction water by distillation, within 8 to 10 hours at a temperature of from 230° to 250° C., while simultaneously passing nitrogen through the vessel, until an AN of about 25 has been reached.

(c) Preparation of the rosin-phenol-glycerol ester oxethylate

After having added 3.3 parts of sodium hydroxide, 438 parts of the rosin-phenol-glycerol ester described under (b) are oxethylated in a pressure vessel, with stirring and feeding in of 550 parts of ethylene oxide at 150° to 170° C., while maintaining a pressure of from 1.5 to 2.5 bars. After the total amount of ethylene oxide has been introduced under pressure, stirring is continued for 1 hour at 150° to 160° C. The rosin oxethylate obtained is brown and viscous and contains 12.5 mols of ethylene oxide. Its cloud point in a 25% butyl diglycol solution is found at 60° C.

EXAMPLE 11

(a) Preparation of the rosin-naphthol compound

At 10° C., 106 parts of boron trifluoride ethyl ether complex are added while stirring within 4 hours to a solution of 604 parts of colophony and 203.2 parts of β-naphthol in 600 parts of tetrachloromethane, and stirring is continued for 14 hours at 15° to 18° C. After working-up according to Example 1, there are obtained 726.3 parts of a clear rosin having an AN of 144.5 and a softening point of from about 115° to 120° C.

(b) Preparation of the rosin-naphthol-glycerol ester 403.6 Parts of the modified rosin described under (a) are esterified in the presence of 5.3 parts of powdered tin with 92 parts of glycerol in a stirring vessel, while eliminating the reaction water by distillation, within 8 to 10 hours at 230° to 250° C., while simultaneously passing nitrogen through the vessel, until an AN of about 25 has been reached.

(c) Preparation of the rosin-naphthol-glycerol ester oxethylate

After having added 3.4 parts of sodium methylate, 477 parts of the rosin-naphthol-glycerol ester described under (b) are oxethylated in a pressure vessel, with stirring and feeding in of 660 parts of ethylene oxide at 150° to 160° C., while maintaining a pressure of from 2 to 8 bars. After the total amount of ethylene oxide has been introduced under pressure, stirring is continued for 1 hour at 150° to 160° C. The rosin acid-glycerol ester addition product obtained contains 15 mols of ethylene oxide. Said product is brown and viscous and shows a cloud point in a 25% butyl diglycol solution of 58° C.

EXAMPLE 12

(a) Preparation of the rosin-guaiacol compound

At 10° C., 264.5 parts of a 25% solution of boron trifluoride in guaiacol are added while stirring within 4 hours to a solution of 604 parts of colophony in 800 parts of tetrachloromethane, and stirring is continued for 14 hours at 15° to 18° C. After working-up according to Example 1 there are obtained 630 parts of a clear rosin having an AN of about 101 and a softening point of about 110° C.

(b) Preparation of the rosin acid-glycerol ester 403.6 Parts of the modified rosin described under (a) are esterified in the presence of 5.3 parts of powdered tin with 92 parts of glycerol in a stirring vessel, while eliminating the reaction water by distillation, within 8 to 10 hours at 230° to 250° C., while simultaneously passing nitrogen through the vessel, until an AN of about 25 has been reached.

(c) Preparation of the rosin acid-glycerol ester oxethylate

After having added 3.4 parts of sodium methylate, 477 parts of the rosin acid-glycerol ester described under (b) are oxalkylated in a pressure vessel, with stirring and feeding in of 660 parts of ethylene oxide at 150° to 160° C., while maintaining a pressure of at first from 2 to 8 bars and subsequently from 1.3 to 3 bars. After the total amount of ethylene oxide has been introduced under pressure, stirring is continued for 1 hour at 150° to 160° C. The resulting rosin acid-glycerol ester addition product is brown and viscous and contains 15 mols of ethylene oxide. The cloud point in a 25% butyl diglycol solution is found at 63.5° C.

EXAMPLE 13

477 Parts of the rosin acid-glycerol ester prepared according to Example 12(b) are reacted according to Example 12(c) with 3300 parts of ethylene oxide. The resulting yellowish brown rosin acid-monoglycerol ester addition product is wax-like and contains 75 mols of ethylene oxide. Its cloud point in a 25% butyl diglycol solution is found at 101° to 102° C.

EXAMPLE 14

(a) Preparation of the benzyl-rosin-glycerol ester

After having added 0.4 part of zinc chloride, 302 parts of colophony are slowly heated to 100° C. in 126.5 parts of benzyl chloride, while passing nitrogen through the mixture, and said temperature is maintained for 2 hours. As soon as the development of hydrogen chloride slows down, the temperature is increased to 200° C. and is maintained at 200° to 210° C. for about 1 hour, until the reaction product is practically free from halogen. After cooling to about 100° C. and adding 92 parts of glycerol and 130 parts of xylene, the mixture is heated to boiling under reflux conditions, and the reaction water is collected by azeotropic distillation in a water separator. After 4 hours the reaction is completed, and the volatile components are removed by vacuum distillation or at a rotation evaporator. As residue there is obtained a clear rosin having an AN of 30 and a softening point of from 120° to 125° C.

(b) Preparation of the rosin oxethylate

After having added 3.4 parts of sodium methylate, 465 parts of the benzyl-rosin-glycerol ester described under (a) are oxethylated with 600 parts of ethylene oxide. The viscous rosin-glycerol addition product obtained is brown and contains 13.6 mols of ethylene oxide. The cloud point in a 25% butyl diglycol solution is found at 58.5° C.

EXAMPLE 15

After having added 3.4 parts of sodium methylate, 465 parts of the benzyl-rosin-glycerol ester prepared according to Example 14(b) are reacted with 1496 parts of ethylene oxide. The resulting rosin oxethylate contains 34 mols of ethylene oxide. It is of a wax-like consistency and brown color, and its cloud point in a 10% sodium chloride solution is found at 61.5° C.

EXAMPLE 16

After having added 3.4 parts of sodium methylate, 465 parts of the benzyl-rosin-glycerol ester prepared according to Example 14(b) are reacted with 2706 parts of ethylene oxide. The rosin oxethylate obtained contains 61.5 mols of ethylene oxide. The appearance corresponds to that of the product of Example 15, and the cloud point in a 10% sodium chloride solution is found at 56.5° C.

EXAMPLE 17

(a) Preparation of the rosin-phenol-glycerol ester

After having added 0.4 part of zinc chloride, 302 parts of colophony are slowly heated to 100° C. together with 128 parts of 4-chlorophenol, while passing nitrogen through the mixture, and the temperature indicated is maintained for 2 hours. As soon as the development of hydrogen chloride slows down, the temperature is increased to 200° C. and is maintained for about 1 hour at 200° to 210° C., until the reaction product is practically free from halogen. After cooling to 100° C. and after the addition of 92 parts of glycerol and 130 parts of xylene, the mixture is boiled at reflux, and the reaction water is collected by azeptropic distillation in a water separator. After about 4 hours the reaction is completed, and the volatile components are removed by vacuum distillation or at a rotation evaporator. As residue there is obtained a clear rosin having an AN of 25 and a softening point of from 120° to 125° C.

(b) Preparation of the rosin oxethylate

After having added 2.4 parts of sodium hydroxide, 468.5 parts of the rosin-phenol-glycerol ester described under (a) are oxalkylated in a pressure vessel, with stirring and feeding in of 616 parts of ethylene oxide at 140° to 150° C., while maintaining a pressure of from 2.5 to 3.5 bars. After the total amount of ethylene oxide has been introduced under pressure, stirring is continued for 1 hour at 140° to 150° C. The resulting viscous rosin-glycerol addition product is reddish brown and contains 14 mols of ethylene oxide. The cloud point in a 25% butyl diglycol solution is found at 60° C.

EXAMPLE 18

(a) Preparation of the rosin-phenol compound

After having added 0.4 part of zinc chloride, 302 parts of colophony are slowly heated to 100° C. together with 128 parts of 4-chlorophenol, while passing nitrogen through the mixture, and said temperature is maintained for 2 hours. Subsequently the temperature is increased to 200° to 210° C., until after about 1 hour the reaction product is free from halogen. After cooling there is obtained a clear rosin having a softening point of about 105° C.

(b) Preparation of the rosin oxethylate

After having added 2.1 parts of sodium hydroxide, 393.5 parts of the rosin-phenol compound described under (a) are oxethylated at 140° to 150° C. in accordance with Example 17(b). The resulting slightly viscous rosin-phenol addition product is olive green and contains 12 mols of ethylene oxide. The cloud point in butyl diglycol is found at 50.5° C.

EXAMPLE 19

(a) Preparation of the rosin-cresol-glycerol ester

302 Parts of colophony are condensed according to Example 17(a) with 114 parts of 5-chloro-2-hydroxytoluene in the presence of 0.4 parts of zinc chloride and subsequently esterified with 92 parts of glycerol. As residue there is obtained a clear rosin having an AN of 24 and a softening point of from 110° to 115° C.

(b) Preparation of the rosin oxethylate

After having added 2.5 parts of sodium hydroxide, 478 parts of the rosin-cresol-glycerol ester described under (a) are reacted according to Example 17(b) with 660 parts of ethylene oxide. The resulting viscous rosin-glycerol addition product contains 15 mols of ethylene oxide. The cloud point in a 25% butyl diglycol solution is found at 60° C.

EXAMPLE 20

(a) Preparation of the rosin-naphthol-glycerol ester

After having added 0.4 part of zinc chloride, 302 parts of colophony are condensed according to Example 17(a) with 489.4 parts of 4-chloro-1-naphthol and are esterified with 92 parts of glycerol. After having removed the volatile components, there is obtained a brown rosin having an AN of 29 and a softening point of from 115° to 125° C.

(b) Preparation of the rosin oxethylate

After having added 2.5 parts of sodium hydroxide, 489 parts of the rosin-naphthol-glycerol ester described under (a) are reacted according to Example 17(b) with 772 parts of ethylene oxide. The viscous rosin-glycerol addition product obtained is reddish brown and contains 18 mols of ethylene oxide. The cloud point in a 25% butyl diglycol solution is found at 59° C.

In the following Table the surface-active properties have been indicated according to the following DIN standards:

Wetting power: DIN 53 901
Surface tension: DIN 53 914
Foaming power: DIN 53 902
Iodine color number: DIN 6162

The foaming properties were judged by the following scale:

0 non-foaming,
1 slightly foaming,
2 slight to medium foaming tendency,
3 medium foaming tendency, and 4 strongly foaming.

TABLE

| Comp. acc. to Example | Wetting power (sec.) 20° C. | Wetting power (sec.) 70° C. | Foaming power C = 2 g/l | Surface tension ($10^{-3}$ N/m) C = 2 g/l | Iodine color number C = 2 g/l |
|---|---|---|---|---|---|
| 1 | >300 | 116 | 1 | 40.5 | 2 |
| 2 | >300 | 86 | 1 | 43.5 | 1 |
| 3 | >300 | 91 | 1 | 42.5 | 1 |
| 4 | 290 | 77 | 1 | 41.5 | 1 |
| 5 | >300 | 78 | 1 | 41.6 | 1 |
| 6 | >300 | 93 | 1 | 44.4 | 1 |
| 7 | >300 | 93 | 1 | 43.7 | 1 |
| 8 | >300 | 93 | 1 | 43.7 | 2 |
| 9 | >300 | 227 | 1 | 42.5 | 1 |
| 10 | 188 | 73 | 1 | 40.0 | 1 |
| 11 | >300 | 114 | 1 | 43.8 | 1-2 |
| 12 | 142 | 67 | 1 | 41.4 | 2 |
| 13 | >300 | 131 | 1 | 40.9 | 1 |
| 14 | >300 | 143 | 1 | 43.6 | 1 |
| 15 | >300 | 145 | 1 | 44.4 | 1 |
| 16 | >300 | 140 | 1 | 42.3 | 1 |
| 17 | 147 | 92 | 1 | 40.2 | 1 |
| 18 | 178 | 78 | 1 | 39.8 | 1 |
| 19 | 148 | 91 | 1 | 42.8 | 1 |
| 20 | 300 | 134 | 1 | 39.3 | 20 |

We claim:
1. A compound of the formula

$$A[(X-O)_n-H]_m$$

wherein
A is a cycloalkyl-, aralkyl- or aryl-modified rosin acid radical or a radical of an ester of a polyhydric alcohol with such an acid,
X stands for the same or different group or groups of, the formulae $$-CH_2-CH_2-$$

or $$-CH_2-CH(CH_3)-,$$

n is a number of from 1 to 100 and
m is an integer of from 1 to 5.

2. A compound as claimed in claim 1, wherein A is the radical of a natural or disproportionated rosin acid reacted with a phenol or a cycloalkyl, aralkyl or aryl halogen compound capable of condensing with said rosin acids while splitting off hydrogen halide, or A is the radical of an ester of a polyhydric low-molecular aliphatic alcohol and such a modified rosin acid.

3. A compound as claimed in claim 1, wherein A is the radical of a reaction product of a natural or disproportionated rosin acid and cyclohexyl chloride, benzyl chloride, bis-chloromethyl-benzene, chloromethyl toluene, chloromethyl naphthalene, chloromethyl diphenyl ether, benzal chloride, chlorophenol, chlorohydroxytoluene, chloro-hydroxy-xylene, chlorobenzyl alcohol, chloro-diphenyl, chloro-diphenyl ether, chloro-naphthalene or chloronaphthol, or A is the radical of an ester of such a modified acid with a di- to hexahydric alkanol of 2 to 6 carbon atoms.

4. A compound as claimed in claim 1, wherein A is the radical of a reaction product of a natural or disproportionated rosin acid with phenol, methylphenol, methoxy-phenol, carboxy-phenol, bis-(hydroxyphenyl)-bis-(methyl)-methane or naphthol, or A is the radical of an ester of such a modified acid with a di- to hexahydric alkanol of 2 to 6 carbon atoms.

5. A compound as claimed in claim 1, wherein A is the radical of a reaction product of natural rosin acid and phenol, methyl-phenol, methoxy-phenol, carboxy-phenol, naphthol, benzyl chloride, chlorophenol, chloro-cresol or chloro-naphthol or the radical of a glycerol ester of such a modified rosin acid.

6. A compound as claimed in claim 1, wherein X is ethylene.

7. A compound as claimed in claim 1, wherein the product of m and n is 1 to 100.

8. A compound as claimed in claim 1, wherein the product of m and n is 8 to 75.

* * * * *